United States Patent
Steffen

(10) Patent No.: US 8,973,688 B2
(45) Date of Patent: Mar. 10, 2015

(54) SUSPENSION SYSTEM AND CONTROL METHOD FOR TRACK-PROPELLED MACHINES

(75) Inventor: Craig M. Steffen, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 362 days.

(21) Appl. No.: 13/330,887

(22) Filed: Dec. 20, 2011

(65) Prior Publication Data

US 2013/0153310 A1 Jun. 20, 2013

(51) Int. Cl.
*B62D 55/116* (2006.01)
*B62D 55/084* (2006.01)
*B60G 17/015* (2006.01)

(52) U.S. Cl.
CPC .......... *B62D 55/116* (2013.01); *B60G 17/0155* (2013.01); *B62D 55/084* (2013.01); *B60G 2500/30* (2013.01)
USPC ...................... 180/9.52; 280/5.514

(58) Field of Classification Search
USPC ................... 180/9.5, 9.52, 41; 280/5.5, 5.514
See application file for complete search history.

(56) References Cited

U.S. PATENT DOCUMENTS

| | | | | |
|---|---|---|---|---|
| 4,030,777 A * | 6/1977 | Rabenseifner | ............ | 280/6.157 |
| 4,580,797 A * | 4/1986 | Ericsson | .................... | 280/5.508 |
| 4,593,931 A * | 6/1986 | Shiratori et al. | ........... | 280/6.157 |
| 5,135,065 A * | 8/1992 | Kawasaki et al. | ................ | 180/41 |
| 5,162,995 A * | 11/1992 | Ikemoto et al. | ................. | 701/38 |
| 5,176,399 A * | 1/1993 | Takehara et al. | ........... | 280/5.507 |
| 5,309,407 A | 5/1994 | Sehr et al. | | |
| 5,480,186 A | 1/1996 | Smith | | |
| 5,684,698 A * | 11/1997 | Fujii et al. | ........................ | 701/38 |
| 5,768,973 A | 6/1998 | Cochran | | |
| 5,984,420 A | 11/1999 | Murray et al. | | |
| 6,168,171 B1 * | 1/2001 | Shono et al. | ................ | 280/5.507 |
| 6,446,980 B1 * | 9/2002 | Kutscher et al. | ........... | 280/5.508 |
| 7,047,735 B2 | 5/2006 | Sprinkle et al. | | |
| 7,055,832 B2 | 6/2006 | Germain | | |
| 7,445,240 B2 * | 11/2008 | Ichimura et al. | ........... | 280/766.1 |
| 7,828,309 B2 | 11/2010 | Berning et al. | | |
| 7,942,427 B2 * | 5/2011 | Lloyd | ........................ | 280/6.157 |
| 2003/0107191 A1* | 6/2003 | Romer et al. | .............. | 280/5.514 |
| 2003/0122328 A1* | 7/2003 | Lin et al. | .................... | 280/5.508 |

(Continued)

FOREIGN PATENT DOCUMENTS

EP 0331175 9/1989
EP 0662177 11/1998

(Continued)

*Primary Examiner* — Anne Marie Boehler
*Assistant Examiner* — Maurice Williams
(74) *Attorney, Agent, or Firm* — Miller, Matthias & Hull LLP

(57) ABSTRACT

A suspension system for cold planer with four tracks is disclosed. The suspension system includes a hydraulic cylinder for each track, an additional bypass valve for each hydraulic cylinder and an additional bypass valve that bypasses the operation of the front control valves that control the elevation of the front tracks during a cutting operation. During transport or roading of the cold planer, the bypass valves are energized by a controller and the energized bypass valves provide communication between the head ends of the left side cylinders and the head ends of the right side cylinders. During roading, the energized bypass valves also provide communication between the rod ends of the front cylinders and between the rod ends of the rear cylinders.

16 Claims, 2 Drawing Sheets

(56) References Cited

U.S. PATENT DOCUMENTS

| | | | |
|---|---|---|---|
| 2004/0113377 A1* | 6/2004 | Klees | 280/5.514 |
| 2006/0055129 A1* | 3/2006 | Amano | 280/5.507 |
| 2007/0278752 A1* | 12/2007 | Schedgick | 280/5.507 |
| 2009/0108663 A1 | 4/2009 | Berning et al. | |
| 2010/0109422 A1 | 5/2010 | Busley et al. | |

FOREIGN PATENT DOCUMENTS

| | | |
|---|---|---|
| EP | 1 154 075 A2 | 11/2001 |
| EP | 1780337 | 5/2007 |

\* cited by examiner

SUSPENSION SYSTEM AND CONTROL METHOD FOR TRACK-PROPELLED MACHINES

TECHNICAL FIELD

This disclosure relates generally to a system and method for enabling the tracks of a track-propelled machine to float or make adjustments in response to terrain changes during roading.

BACKGROUND

Cold planers, also known as road milling machines, are configured to scarify, remove, mix, or reclaim material from the surface of bituminous, concrete, or asphalt roadways and other surfaces using a rotatable planing drum mounted on a frame. The frame may be mounted on a plurality of cylinders coupled to endless tracks which support the cold planer while the tracks transport the cold planer along the working surface or roadway. Typically, large cold planers may be supported above four tracks by four cylinders, including right and left front tracks and cylinders and right and left rear tracks and cylinders.

The front cylinders may be adjusted between extended and retracted positions to control the depth and shape of cut made by the planing drum by raising or lowering the frame. Actuation of the cylinders may be controlled by a machine operator or a suitable control mechanism, such as a programmable controller.

However, while roading a cold planer to or from a work location, the positions of the cylinders are manually adjustable, but are otherwise fixed between any manual adjustments that are made. Therefore, during roading, the ride for the operator may be very rough due to the fixed positions of the cylinders when the cold planer is not performing a milling operation. The disclosed system is directed towards improving the ride for the operator while a cold planer or other track-propelled machine is being roaded to or from a worksite.

SUMMARY OF THE DISCLOSURE

A suspension system for a tracked vehicle is disclosed. The suspension system includes a left front cylinder, a left rear cylinder, a right front cylinder and a right rear cylinder. Each of the cylinders includes a head end and a rod end. The suspension system may also include a left front bypass valve, a left rear bypass valve, a right front bypass valve, a right rear bypass valve and a front central bypass valve. The left front bypass valve may be in communication with the head end of the left front cylinder and the left rear bypass valve. The left rear bypass valve may be in communication with the head end of the left rear cylinder and the left front bypass valve. The right front bypass valve may be in communication with the head end of the right front cylinder and the right rear bypass valve. And, the right rear bypass valve may be in communication with the head end of the right rear cylinder and the right front bypass valve. The front central bypass valve may be in communication with the rod end of the left front cylinder and the rod end of the right front cylinder. And, the rod end of the left rear cylinder may be in communication with the rod end of the right rear cylinder.

In another embodiment, a disclosed suspension system for a tracked vehicle having four tracks includes a left front cylinder, a left rear cylinder, a right front cylinder and a right rear cylinder. Each of the cylinders includes a head end and a rod end. The suspension system may also include a left front bypass valve, a left rear bypass valve, a right front bypass valve, a right rear bypass valve and a front central bypass valve. The left front bypass valve may be in communication with the head end of the left front cylinder and the left rear bypass valve. The left rear bypass valve may be in communication with the head end of the left rear cylinder and the left front bypass valve. The right front bypass valve may be in communication with the head end of the right front cylinder and the right rear bypass valve. The right rear bypass valve may be in communication with the head end of the right rear cylinder and the right front bypass valve. The front central bypass valve may be in communication with the rod end of the left front cylinder and the rod end of the right front cylinder. The rod end of the left rear cylinder may be in communication with the rod end of the right rear cylinder. The rear control valve may be in communication with the rod ends of the left and right rear cylinders and the left and right rear bypass valves. Further, at least the left front bypass valve, the right front bypass valve, the left rear bypass valve, the right rear bypass valve and the front central bypass valve may be linked to a controller. When the controller sends signals to open the left and right front bypass valves, the left and right rear bypass valves and the front central bypass valve, communication is established between: (1) the head ends of the left front cylinder and the left rear cylinder through the left front bypass valve and the left rear bypass valves; (2) the head ends of the right front cylinder and the right rear cylinder through the right front bypass valve and the right rear bypass valve; and (3) the rod ends of the left front cylinder and the right front cylinder through the front central bypass valve.

In another embodiment, a method for suspending a cold planer having at least four tracks while roading the cold planer is disclosed. The cold planer includes a left front cylinder, a left rear cylinder, a right front cylinder and a right rear cylinder. Each of the cylinders includes a head end and a rod end. The cold planer may further include a left front bypass valve, a left rear bypass valve, a right front bypass valve, a right rear bypass valve and a front central bypass valve. The left front bypass valve may be in communication with the head end of the left front cylinder and the left rear bypass valve. The left rear bypass valve may be in communication with the head end of the left rear cylinder and the left front bypass valve. The right front bypass valve may be in communication with the head end of the right front cylinder and the right rear bypass valve. The right rear bypass valve may be in communication with the head end of the right rear cylinder and the right front bypass valve. The front central bypass valve may be in communication with the rod end of the left front cylinder and the rod end of the right front cylinder. And, the rod end of the left rear cylinder may be in communication with the rod end of the right rear cylinder. The method may include opening the left and right front bypass valves, the left and right rear bypass valves and the front central bypass valve to establish communication between: (1) the head ends of the left front cylinder and left rear cylinder through the left front bypass valve and the left rear bypass valve; (2) the head ends of the right front cylinder and the right rear cylinder through the right front bypass valve and the right rear bypass valve; and (3) the rod ends of the left front cylinder and the right front cylinder through the front central bypass valve.

In any one or more of the embodiments described above, the left front bypass valve, the right front bypass valve, the left rear bypass valve, the right rear bypass valve and the front central bypass valve may be linked to a controller. Further, when the controller sends signals to open the left and right front bypass valves, the left and right rear bypass valves and the front central bypass valve, communication may be established between the head ends of the left front cylinder and the left rear cylinder through the left front bypass valve and the left rear bypass valve. Further, communication may be established between the head ends of the right front cylinder and the right rear cylinder through the right front bypass valve and the right rear bypass valve. Still further, communication may be established between the rod ends of the left front cylinder and the right front cylinder through the front central bypass valve.

In any one or more of the embodiments described above, the system may further include a left front control valve in communication with the head end and the rod end of the left front cylinder. The system may further include a right front control valve in communication with the head end and the rod end of the right front cylinder. The system may further include a rear control valve in communication with the head end and the rod end of the left rear cylinder and the head end and the rod end of the right rear cylinder.

In any one or more of the embodiments described above, the right front control valve is in communication with the rod end of the right front cylinder and the left front control valve is in communication with the rod end of the left front cylinder.

In any one or more of the embodiments described above, the rear control valve is in communication with the rod ends of the left and right rear cylinders and the left and right rear bypass valves.

In any one or more of the embodiments described above, the system may further include a left front counter balance valve in communication with the head and rod ends of the left front cylinder. The system may further include a right front counter balance valve in communication with the head and rod ends of the right front cylinder. The system may further include a rear central counter balance valve in communication with the head and rod ends of the left and right rear cylinders.

In any one or more of the embodiments described above, the left front control valve, the right front control valve and the rear control valve may be in communication with a pump and a drain.

In any one or more of the embodiments described above, the left and right front bypass valves, the left and right rear bypass valves and the front central bypass valve may be directional control valves with at least two connections and at least two positions including a closed position and an open bidirectional flow position.

In any one or more of the embodiments described above, the left front counter balance valve may also be in communication with the left front bypass valve and the left front control valve and the right front counter balance valve may be in communication with the right front bypass valve and the right front control valve.

In any one or more of the embodiments described above, the rear central counter balance valve may be in communication with the head and rod ends of both the left and right rear cylinders.

In any one or more of the embodiments described above, the controller may send signals to open the left and right front bypass valves, the left and rear bypass valves and the front central bypass valve prior to roading.

DETAILED DESCRIPTION

Figure 1:
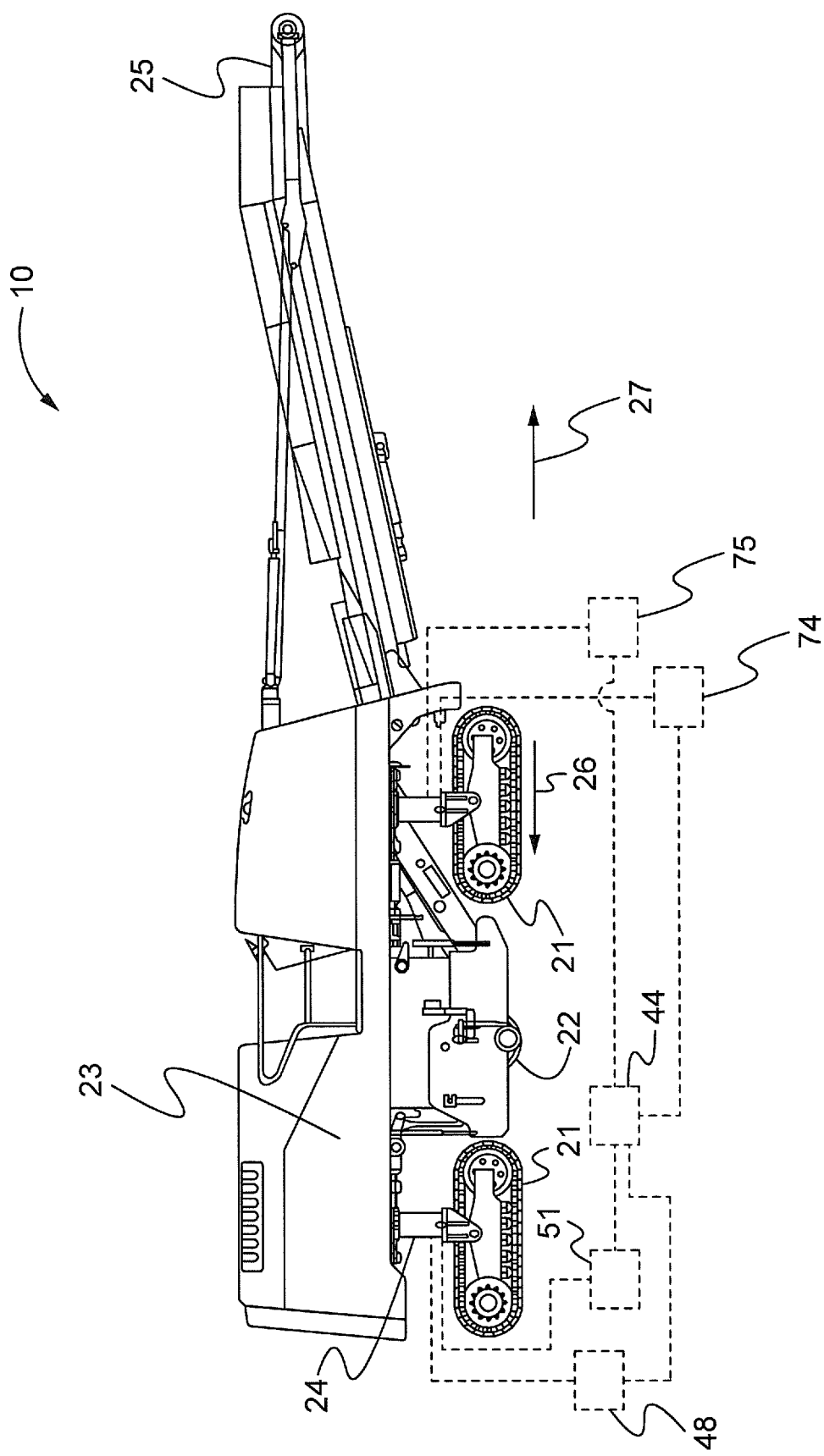
FIG. 1 is a side view of a cold planer incorporating a disclosed suspension system.
Figure 2:
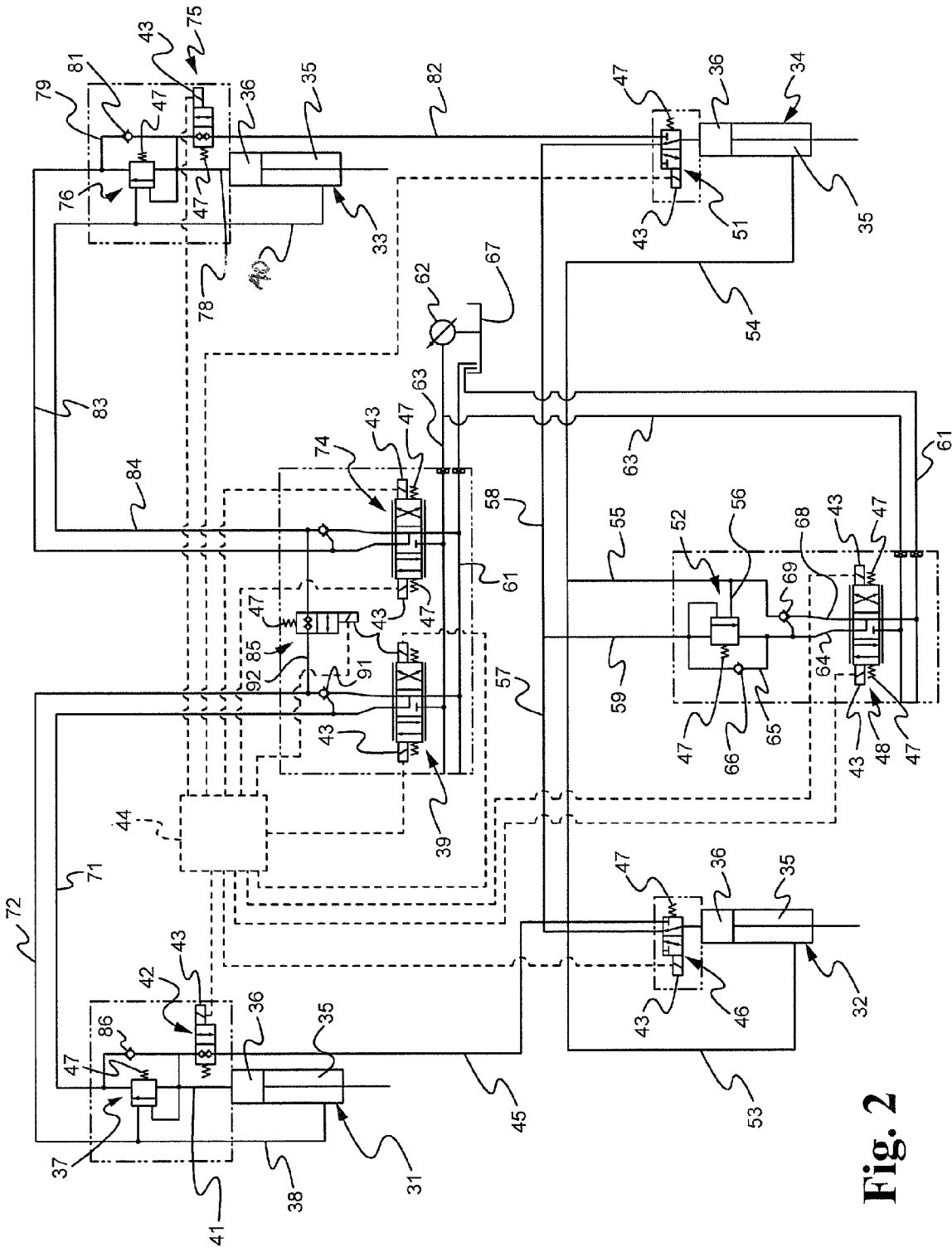
FIG. 2 is a schematic diagram of a disclosed hydraulic suspension system for vehicles like the cold planer illustrated in FIG. 1.

While a cold planer 10 is used as an exemplary embodiment, this disclosure, the disclosed suspension systems and the disclosed control methods are applicable to other track-propelled machines as well. FIG. 1 illustrates the cold planer 10 that is equipped with a suspension system 20 as illustrated in FIG. 2. Generally, the cold planer 10 includes a plurality of drive tracks 21 configured for propelling the cold planer 10 along a road surface. The cold planer 10 also includes a cutting drum 22 for milling the road surface. A cutting plane of the cold planer 10 is tangent to the bottom of the cutting drum 22 and parallel to the direction of travel of the cold planer 10. The tracks 21 of the cold planer 10 are connected to the main body 23 of the cold planer 10 by hydraulic legs 24. The hydraulic legs 24 are configured to raise or lower the cutting drum 22 relative to the tracks 21 so as to control the elevation of the cutting plane of the cutting drum 22. The cold planer 10 is further equipped with a conveyor 25 configured to transport excavated asphalt from the cutting drum 21 to a discharge location such as the bed of a dump truck.

In use, the hydraulic legs 24 are adjusted such that the cutting plane of the cutting drum 22 is set at a desired elevation. Once the cutting plane elevation has been set, the tracks are driven in a first direction 26 so that the cold planer is propelled in a second or forward direction 27. Concurrently, the cutting drum 22 tends to push the cold planer 10 in a rearward direction so that friction between the tracks 21 and the road exceeds the friction between the cutting drum 22 and the road as the cold planer 10 moves in the forward direction 27. Certain elements of the suspension system 20 are also illustrated in FIG. 1 but will be explained in detail in connection with FIG. 2.

Turning to FIG. 2, the cold planer 10 includes four tracks 21 and therefore four hydraulic legs 24 (see FIG. 1). Each hydraulic leg 24 includes a hydraulic cylinder so that the cold planer 10 includes a left front hydraulic cylinder 31, a left rear hydraulic cylinder 32, a right front hydraulic cylinder 33 and a right rear hydraulic cylinder 34. Each hydraulic cylinder includes a rod end 35 and a head end 36. Turning first to the left front cylinder 31, the head end 36 of the left front cylinder 31 may be in communication with a counter balance valve 37 by way of the hydraulic line 38 that extends between the rod end 35 of the left front cylinder 31 and the left front control valve 39. The head end 36 of the left front cylinder 31 may be in communication with the counter balance valve 37 by way of the hydraulic line 41. The head end 36 of the left front cylinder 31 may also be in communication with a left front bypass valve 42 that may be a two port/two position bidirectional control valve as shown in FIG. 2. The valve 42 may include a solenoid 43 that is linked to a controller 44. The left front bypass valve 42, along with the hydraulic line 45, may provide communication between the head end 36 of the left front cylinder 31 and the right rear bypass valve 51. The right rear bypass valve 51 may be a directional control valve with three ports and two positions as shown in FIG. 2. The left rear bypass valve 46, which is biased into the position shown in FIG. 2 by the spring 47, provides communication between the head end 36 of the left rear cylinder 32 and the rear control valve 48. When shifted to the right, the left rear bypass valve 46 provides communication between the left front bypass valve 42 and the head end 36 of the left rear cylinder 32. The left rear bypass valve 46 may also include a solenoid 43 that is linked to the controller 44.

In the position shown in FIG. 2, the left rear bypass valve 46 as well as the right rear bypass valve 51 provide communication between the head ends 36 of their respective cylinders 32, 34 and the rear counter balance valve 52. The counter balance valve 52 is normally in the closed position as shown in FIG. 2 under the bias of the spring 47. However, when pressure in the rod ends 35 of the left rear cylinder 32 and right rear cylinder 34 exceed a predetermined pressure, that pressure may be communicated via the lines 53, 54, 55 and 56 to the counter balance valve 52, thereby overcoming the bias of the spring 47 to provide communication from the head ends 36 of the left rear cylinder 32 and right rear cylinder 34 through the left and right rear bypass valves 46, 51, through the lines 57, 58, 59 and through the open counter balance valve 52 to the rear control valve 48. The rear control valve 48 may be a directional control valve with four ports and three positions as shown. Dual solenoids 43 and springs 47 may be provided. The rear control valve 48 is normally in the neutral position shown which, when the counter balance valve 52 is open, provides communication between the line 59 and the drain 61. When shifted to the left, the rear control valve 48 also provides communication between the line 59 and the drain 61, but may also provide communication between the pump 62 the rod ends 35 of the left and right rear cylinders 32, 34 by way of the line 63 to the lines 68 and 55, which are in communication with the lines 53, 54. When shifted to the right, the rear control valve 48 may provide communication between the pump 62 and the line 64.

The line 64 is connected to the line 65 which permits flow past the check valve 66 and to the head ends 36 of the left and right rear cylinders 32, 34 via the lines 59, 57, 58 and left and right rear bypass valves 46, 51 respectively. With the rear control valve 48 shifted to the left, communication is provided between the reservoir 67, through the pump 62, through the line 63 and into the line 68 and past the check valve 69 to the lines 53, 54 and on to the rod ends 35 of the left and right rear cylinders 32, 34.

When the left front control valve 43 is closed and when the left front counter balance valve 37 is open, communication may be established between the head end 36 of the left front cylinder 31 and the hydraulic line 71, which leads to the left front control valve 39. The left front control valve 39 provides selective communication between the pump 62 and reservoir 67 and the head end 36 and rod end 35 of the left front cylinder 31. Specifically, the left front control valve 39 may be a directional control valve with four ports and three positions. In the center position illustrated in FIG. 2, the hydraulic line 71 is in communication with drain 61. When shifted to the right, the pump 62 and reservoir 67 are in communication with the line 71 and the line 72 is in communication with the drain 61 and reservoir 67. Thus, when the left front control valve 39 is shifted to the right, the reservoir 67 and pump 62 are in communication with the hydraulic line 71 and therefore the head end 36 of the left front cylinder 31 is in communication with the pump 62 by way of the pump line 63, line 71, check valve 86 and line 41. When shifted to the left, the left front control valve 39 establishes communication between the hydraulic line 71 and the drain 61 and further, the valve 39 establishes communication between the reservoir 67 and pump 62 and the hydraulic line 72, which leads to the rod end 35 of the left front hydraulic cylinder 31.

The right front control valve 74 may operate in the same manner as the left front control valve 39 and may also be a directional control valve with four ports and three positions.

Like the left front cylinder 31, the right front cylinder 33 may also be coupled to a right front bypass valve 75, a counter balance valve 76 and the right front control valve 74. The valves 74, 75, 76 are also equipped with springs 47 and the right front control valve 74 and right front bypass valves 75 are equipped with solenoids 43 that are linked to the controller 44. The right rear bypass valve 51 also includes a spring 47 and a solenoid 43 that is linked to the controller 44.

The head ends 36 of the right front cylinder 33 and right rear cylinder 35 may be in communication when the bypass valve 75 is opened and when bypass valve 51 is open. Fluid may then flow from the head end 36 of the right front cylinder 33, through the hydraulic line 78, through the open right front bypass valve 75, through the hydraulic line 82 to the right rear bypass valve 51. With the right rear bypass valve 51 shifted to the right, fluid then passes from the hydraulic line 82, through the right rear bypass valve 51 to the head end 36 of the right rear cylinder 35.

With the counter balance valve 76 open, but with the right front bypass valve 75 closed, communication is established between the head end 36 of the right front cylinder 33 and the hydraulic line 83, which is coupled to the right front control valve 74. In the neutral position shown in FIG. 2, the hydraulic line 83 is in communication with the drain 61. However, with the right front control valve 74 shifted to the right and the right front bypass valve 75 closed, the pump 62 and reservoir 67 are in communication with the hydraulic line 83, which, in turn, is in communication with the head end 36 of the right front cylinder 33 via the check valve 81 and the line 78. With the right front control valve 74 shifted to the left, the pump 62 delivers fluid from the reservoir 67, through the line 63, through the right front control valve 74, through the hydraulic line 84 to the rod end 35 of the right front cylinder 33.

An additional front central bypass valve 85 is coupled between the hydraulic lines 72, 84 and left and right front control valves 39, 74. The front central bypass valve 85 also includes a solenoid 43 which is linked to the controller 44. When opened, communication is established between the hydraulic lines 72, 84 and therefore communication is established between the rod end 35 of the left front hydraulic cylinder 31 and the rod end 35 of the right front hydraulic cylinder 33.

The system 20 does not permit or require flow from the left front control valve 39 to the left rear bypass valve 46, or from the right front control valve 74 to the right rear bypass valve 51. When the left front control valve 39 is active, the left front bypass valve 42 is closed. When the right front control valve 74 is active, the right front bypass valve 75 is closed. The purpose of the check valves 81, 86 is to force oil through the counterbalance valves 37, 76 respectively when retracting the cylinders 31-34, but allow free flow when extending the cylinders 31-34. This is because head end pressure naturally builds when extending the cylinders 31-34 due to the weight of the cold planer 10. But when retracting the cylinders 31-34, the weight of the cold planer 10 is acting in the wrong direction and thus the purpose of the counterbalance valves 37, 76 is to artificially build pressure to prevent the cylinders 31-34 from overrunning the valve flow.

Thus, as shown in FIG. 2, the head ends 36 of the left front cylinder 31 and the left rear cylinder 32 are in communication the left front bypass valve 42, the hydraulic line 45, and the left rear bypass valve 46. The head ends 36 of the right front cylinder 33 and the right rear cylinder 34 are in communication via the right front bypass valve 75, the hydraulic line 82, and the right rear bypass valve 51. Further, FIG. 2 also shows that the rod end 35 of the left front cylinder 31 is in communication with the rod end 35 of the right front cylinder 33 via the hydraulic line 38, the front central bypass valve 85, and the hydraulic line 84. Further, the rod end 35 of the left rear cylinder 32 is in communication with the rod end 35 of the right rear cylinder 34 via the hydraulic lines 53, 54. FIG. 2 also shows the employment of five additional valves 42, 46, 75, 51 and 85 which, when energized, allows the flow of hydraulic fluid between the cylinders 31, 32, 33, 34 without requiring flow from the control valves 39, 74 that normally control elevation.

In short, by providing communication between the front cylinders 31, 33 and their respective rear cylinders 32, 34 and by providing communication between the front cylinders 31, 33 and between their rear cylinders 32, 34, a natural flow of oil occurs between the cylinders 31-34 which allows the tracks 21 to more closely follow the contour of the ground during roading of the cold planer.

Industrial Applicability

Thus, an improved hydraulic system 20 is disclosed which provides for an improved ride when the cold planer 10 is being roaded. Specifically, the head end 36 of the left front cylinder 31 may be in communication with the head end 36 of the left rear cylinder 32 via the front left bypass valve 42, hydraulic line 45 and left rear bypass valve 46. Similarly, the head end 36 of the right front cylinder 33 may be in communication with the head end 36 of the right rear cylinder 34 by way of the right front bypass valve 75, hydraulic line 82 and right rear bypass valve 51. Connecting the head ends 36 of the left side cylinders 31, 32 and connecting the head ends of the right side cylinders 33, 34 provides for a more level ride from the front of the cold planer 10 to the rear of the cold planer 10.

Further, the rod ends 35 of the front cylinders 31, 33 may be in communication by way of the hydraulic line 38, check valve 91, hydraulic line 92, front central bypass valve 85, hydraulic line 84 and hydraulic line 40. The rod end 35 of the left rear cylinder 32 may be in communication with the rod end 35 of the right rear cylinder 34 by way of the hydraulic lines 53, 54. By employing the bypass valves 42, 43, 75, 51 and 85, the flow of oil between the cylinders 31, 32, 33, 34 is permitted without requiring any flow through the left front control valve 39, the right front control valve 74 or the rear control valve 48. In other words, when the bypass valves 42, 46, 85, 75 and 51 are energized, the flow of oil between the cylinders 31, 32, 33, 34 is permitted without flow through any of the control valves 39, 74, 48.

In operation, when the cold planer 10 is in a cutting operation, the bypass valves 42, 46, 75, 51, 85 may be turned off and the suspension system 20 may operate normally by controlling the elevation of the machine using the front cylinders 31, 33 and the front control valves 39, 74. Typically, the rear cylinders 32, 34 are not used to control elevation. To transport or road the cold planer 10 between locations, the valves 42, 46, 85, 75, 51 are energized by the controller 44 allowing the flow of oil between the head ends 36 of the left cylinders 31, 32, the head ends 36 of the right cylinders 33, 34, the rod ends 35 of the front cylinders 31, 33 and the rod ends 35 of the rear cylinders 32, 34. The scheme illustrated in FIG. 2 allows for a natural flow of hydraulic oil which, in turn, allows the tracks 21 to more closely follow the contour of the ground while moving for a smoother ride.

What is claimed is:

1. A suspension system for a tracked vehicle, the system comprising:

a left front cylinder, a left rear cylinder, a right front cylinder and a right rear cylinder, each of said cylinders including a head end and a rod end, a left front bypass valve, a left rear bypass valve, a right front bypass valve, a right rear bypass valve and a front central bypass valve, the left front bypass valve in communication with the head end of the left front cylinder and the left rear bypass valve, the left rear bypass valve also in communication with the head end of the left rear cylinder, the right front bypass valve in communication with the head end of the right front cylinder and the right rear bypass valve, the right rear bypass valve also in communication with the head end of the right rear cylinder, the front central bypass valve in communication with the rod end of the left front cylinder and the rod end of the right front cylinder, the rod end of the left rear cylinder in communication with the rod end of the right rear cylinder, a left front control valve in communication with the head end and the rod end of the left front cylinder, a right front control valve in communication with the head end and the rod end of the right front cylinder, and a rear control valve in communication with the head end and the rod end of the left rear cylinder and the head end and rod end of the right rear cylinder.

2. The system of claim 1 wherein the left front bypass valve, the right front bypass valve , the left rear bypass valve, the right rear bypass valve and the front central bypass valve are linked to a controller, wherein, when the controller sends signals to open the left and right front bypass valves, the left and right rear bypass valves and the front central bypass valve, communication is established between the head ends of the left front cylinder and the left rear cylinder through the left front bypass valve and the left rear bypass valve, the head ends of the right front cylinder and the right rear cylinder through the right front bypass valve and the right rear bypass valve, and the rod ends of the left front cylinder and the right front cylinder through the front central bypass valve.

3. The system of claim 1 wherein the right front control valve is in communication with the rod end of the right front cylinder and the left front control valve is in communication with the rod end of the left front cylinder.

4. The system of claim 1 wherein the rear control valve is in communication with rod ends of the left and right rear cylinders and the left and right rear bypass valves.

5. The system of claim 1 wherein the left front control valve, the right front control valve and the rear control valve are in communication with a pump and a drain.

6. The system of claim 1 wherein the left and right front bypass valves, the left and right rear bypass valves and the front central bypass valve are directional control valves with at least two connections and at least two positions including a closed position and an open bidirectional flow position.

7. A suspension system for a tracked vehicle, the system comprising:

a left front cylinder, a left rear cylinder, a right front cylinder and a right rear cylinder, each of said cylinders including a head end and a rod end, a left front bypass valve, a left rear bypass valve, a right front bypass valve, a right rear bypass valve and a front central bypass valve, the left front bypass valve in communication with the head end of the left front cylinder and the left rear bypass valve, the left rear bypass valve also in communication with the head end of the left rear cylinder, the right front bypass valve in communication with the head end of the right front cylinder and the right rear bypass valve, the right rear bypass valve also in communication with the head end of the right rear cylinder, the front central bypass valve in communication with the rod end of the left front cylinder and the rod end of the right front cylinder, the rod end of the left rear cylinder in communication with the rod end of the right rear cylinder, a left front counterbalance valve in communication with the head and rod ends of the left front cylinder, a right front counterbalance valve in communication with the head and rod ends of the right front cylinder, and a rear central counterbalance valve in communication with the head and rod ends of the left and right rear cylinders.

8. The system of claim 7 wherein the left front counterbalance valve is also in communication with the left front bypass valve and the left front control valve, and the right front counterbalance valve is also in communication with the right front bypass valve and the right front control valve.

9. The system of claim 7 wherein the rear central counterbalance valve is in communication with the head and rod ends of both the left and right rear cylinders.

10. A suspension system for a tracked vehicle having four tracks, the system comprising:

a left front cylinder, a left rear cylinder, a right front cylinder and a right rear cylinder, each of said cylinders including a head end and a rod end, a left front bypass valve, a left rear bypass valve, a right front bypass valve, a right rear bypass valve and a front central bypass valve, the left front bypass valve in communication with the head end of the left front cylinder and the left rear bypass valve, the left rear bypass valve also in communication with the head end of the left rear cylinder, the right front bypass valve in communication with the head end of the right front cylinder and the right rear bypass valve, the right rear bypass valve also in communication with the head end of the right rear cylinder, the front central bypass valve in communication with the rod end of the left front cylinder and the rod end of the right front cylinder, the rod end of the left rear cylinder in communication with the rod end of the right rear cylinder, a rear control valve is in communication with rod ends of the left and right rear cylinders and the left and right rear bypass valves, a left front control valve in communication with the head end and the rod end of the left front cylinder, a right front control valve in communication with the head end and the rod end of the right front cylinder, and a rear control valve in communication with the head end and the rod end of the left rear cylinder and the head end and rod end of the right rear cylinder, wherein at least the left front bypass valve, the right front bypass valve, the left rear bypass valve, the right rear bypass valve and the front central bypass valve being linked to a controller, wherein, when the controller sends signals to open the left and right front bypass valves, the left and right rear bypass valves and the front central bypass valve, communication is established between the head ends of the left front cylinder and the left rear cylinder through the left front bypass valve and the left rear bypass valve, the head ends of the right front cylinder and the right rear cylinder through the right front bypass valve and the right rear bypass valve, and the rod ends of the left front cylinder and the right front cylinder through the front central bypass valve.

11. The system of claim 10 wherein the right front control valve is in communication with the rod end of the right cylinder and the left front control valve is in communication with the rod end of the left front cylinder.

12. The system of claim 10 wherein the left front control valve, the right front control valve and the rear control valve are in communication with a pump and a drain.

13. The system of claim 10 wherein the left and right front bypass valves, the left and right rear bypass valves and the front central bypass valves are directional control valves with at least two connections and at least two positions including a closed position and an open bidirectional flow position.

14. A suspension system for a tracked vehicle having four tracks, the system comprising:

a left front cylinder, a left rear cylinder, a right front cylinder and a right rear cylinder, each of said cylinders including a head end and a rod end, a left front bypass valve, a left rear bypass valve, a right front bypass valve, a right rear bypass valve and a front central bypass valve, the left front bypass valve in communication with the head end of the left front cylinder and the left rear bypass valve, the left rear bypass valve also in communication with the head end of the left rear cylinder, the right front bypass valve in communication with the head end of the right front cylinder and the right rear bypass valve, the right rear bypass valve also in communication with the head end of the right rear cylinder, the front central bypass valve in communication with the rod end of the left front cylinder and the rod end of the right front cylinder, the rod end of the left rear cylinder in communication with the rod end of the right rear cylinder, a rear control valve is in communication with rod ends of the left and right rear cylinders and the left and right rear bypass valves, a left front counterbalance valve in communication with the head and rod ends of the left front cylinder, a right front counterbalance valve in communication with the head and rod ends of the right front cylinder, and a rear central counterbalance valve in communication with the head and rod ends of the left and right rear cylinders, wherein at least the left front bypass valve, the right front bypass valve, the left rear bypass valve, the right rear bypass valve and the front central bypass valve being linked to a controller, wherein, when the controller sends signals to open the left and right front bypass valves, the left and right rear bypass valves and the front central bypass valve, communication is established between the head ends of the left front cylinder and the left rear cylinder through the left front bypass valve and the left rear bypass valve, the head ends of the right front cylinder and the right rear cylinder through the right front bypass valve and the right rear bypass valve, and the rod ends of the left front cylinder and the right front cylinder through the front central bypass valve.

15. The system of claim 14 wherein the left front counterbalance valve is also in communication with the left front bypass valve and the left front control valve, and the right front counterbalance valve is also in communication with the right front bypass valve and the right front control valve.

16. The system of claim 14 wherein the rear central counterbalance valve is in communication with the head and rod ends of both the left and right rear cylinders.

* * * * *

UNITED STATES PATENT AND TRADEMARK OFFICE
CERTIFICATE OF CORRECTION

PATENT NO. : 8,973,688 B2  
APPLICATION NO. : 13/330887  
DATED : March 10, 2015  
INVENTOR(S) : Craig M. Steffen Page 1 of 1

It is certified that error appears in the above-identified patent and that said Letters Patent is hereby corrected as shown below:

In the Specification:

Column 7, line 18 (Approx.), delete "Industrial Applicability" and insert -- INDUSTRIAL APPLICABILITY --.

Signed and Sealed this  
Second Day of February, 2016

Michelle K. Lee  
*Director of the United States Patent and Trademark Office*